Patented May 6, 1941

2,240,529

UNITED STATES PATENT OFFICE 2,240,529

MANUFACTURE OF PLASTERS

George Crawford Tyce, Norton-on-Tees, and Victor Lefebure, London, England, assignors to Imperial Chemical Industries Limited, a corporation of Great Britain No Drawing. Application March 11, 1936, Serial No. 68,350. In Great Britain March 13, 1935

11 Claims. (Cl. 260—29)

This invention relates to the manufacture of plasters, particularly plasters having incorporated therein a resin.

It is an object of this invention to provide a plaster, or similar cementitious material, with a glossy appearance, and one that can easily be moulded into any desired shape, or on to any required surface, and has the advantage that it sets rapidly to an extremely hard condition.

According to one form of our invention, we prepare a slurry of a calcium sulphate plaster, for example, plaster of Paris, and a cold-hardening urea-formaldehyde for thio-urea-formaldehyde resin syrup, such as may be obtained for example by condensing urea or thiourea and formaldehyde in aqueous medium and removing a portion of the water, water being added if necessary to obtain the desired consistency. The resin employed may be either of the stabilised or unstabilised type. Preferably a resin syrup of the unstabilised type is employed, i. e. one without the addition of NH$_4$Cl or other stabilising material. It may, if desired, be accelerated with acid or acid salts to obtain a short setting time. The setting time of the mix is shorter than the setting time of the resin syrup and longer than the setting time of plaster and water alone.

While in the plastic state the slurry may be cast or moulded or even trowelled or rolled on to surfaces. The more dilute slurries may be applied to surfaces by brushing or spraying. When the set has occurred a glossy face is produced which on drying out, either in the air or in a drying chamber, becomes extremely hard. It is then amenable to working by chiselling, turning or sawing. The hardened products resemble alabaster in appearance and are of uniform colour, unless deliberately modified by admixture of aggregates or pigments. The hardening of the resin and the setting of the plaster do not proceed independently, but each is influenced by the other. The water required for the hydration and setting of the plaster is withdrawn from the resin syrup, while the accelerators present may affect both resin and plaster. Owing to the continued presence of water in the mass the net change of volume on setting is comparatively small, so that the surfaces do not tend to crack.

Glycerol, sugars, alginates or other water-soluble softening agents may be added to the resin syrup or slurry, in order to obtain products of varying degrees of elasticity.

Fillers or aggregates of various kinds may be incorporated in the slurry, for example fibrous material such as disintegrated paper, wool, cotton or linen; ground glass, fine "silver" sand, suitably graded alabaster or marble chippings, or aggregates consisting of set plaster as described in U. S. specification No. 60,543. The presence of such aggregates is of advantage in overcoming a possible tendency of the surfaces of the products to crack or "craze." Pigments may also be incorporated in the slurry to give any desired decorative effect.

We have found that a plaster substantially free from impurities such as iron, silica and alumina gives the most satisfactory results. Such a plaster sets hard and retains its whiteness when slurried with the maximum amount of resin syrup. Examples of plasters of this nature, which have been found to give excellent results are those known as "fine boiled hemihydrate plasters."

The ratio of resin syrup to plaster is not critical. The maximum ratio tried has been 2 parts of resin syrup to 3 parts of plaster. The minimum ratio has been 1 part of resin syrup to 10 parts of plaster, plus the amount of water necessary to form a slurry. The higher ratio of resin confers extra hardness and extra gloss on the set product.

The maximum permissible ratio of resin syrup to plaster varies with different types of plaster. With fine boiled hemihydrate plaster the ratio appears to be unlimited, but with accelerated anhydrite plaster the maximum ratio is 100 parts of plaster to 8 parts of resin syrup. Accelerated anhydrite plaster consists essentially of finely ground mineral anhydrite mixed with small proportions of certain metal sulphates acting as accelerators for the hydration of the anhydrite.

A suitable procedure for veneering building blocks is as follows. In this process an anhydrite building block consisting of plaster of cellular structure such as that described in U. S. specification No. 2,015,481 receives a veneer of the plaster-resin product, either plain or incorporating pigments designed to give the appearance of marble, wood graining or the like. The resin syrup, either accelerated or unaccelerated and either plasticised or unplasticised, is mixed intimately with the fine boiled hemihydrate plaster. A suitable mixture is 100 parts by weight of plaster, 40 parts of a 45% urea-formaldehyde resin syrup and 2% of a 25% solution of HCl. Design is introduced into the mix by incorporating pigments. The mix is placed on a glass, Celluloid, ebonite, oiled steel or the like, plate and tamped.

Finally the block is forced into the plastic and left until the "set" has taken place. The block is then lifted away from the glass face and allowed to dry. The finished product is extremely hard and glossy, and has the appearance of good quality marble. Wax, resins, lacquers or the like may be applied to render the surface extremely resistant to water. If the surface be abraded away either by accident or design, a further polished surface can be generated by suitable abrasion. Blocks have been made having faces of this material in various designs such as alabaster, marble, wood graining, plain colours or travertine effects.

Example

A plaster block measuring 2 ft. x 1 ft. was veneered to a thickness of 1/8" as follows:

1.5 kg. of a fine boiled hemi-hydrate plaster such as that known in the trade under the name "Cafferata" was thoroughly mixed with 30 g. disintegrated paper and then gauged with 680 cc. urea-formaldehyde resin syrup, 150 cc. of water and 7 cc. of 50% hydrochloric acid. The resulting plastic mass was laid on a polished glass plate and tamped to remove air bubbles. The plaster block was then laid firmly into this mass to ensure good adhesion. After about 45 minutes the veneered block was stripped from the glass plate and dried at 40° C. The stripped surface was very highly polished.

Our plaster-resin slurries are also suitable for application by brushing or spraying, water being used as a diluent where necessary. Thus durable glossy surfaces can readily be obtained on walls, ceilings and other surfaces without the necessity of using paints requiring relatively expensive organic solvents or thinners. Moreover, difficulties due to the use of oil paints on plaster, cement or the like, resulting in non-uniform contact and subsequent cracking and blistering, are avoided by the use of our slurries. The presence of water and the absence of organic solvents, coupled with the presence of a water-setting plaster in the slurry make it possible to effect very rapid decorative treatments which are extremely durable. By allowing the applied slurry to set in contact with a superposed polished surface, which is subsequently stripped off, permanently glossy surfaces are obtained.

Various modifications may be made in the materials and procedure hereinbefore described, and all such modifications are intended to come within the scope of the appended claims in so far as they achieve to a useful degree the new results and advantages hereinbefore disclosed.

We claim:

1. A process for the manufacture of a plaster suitable for casting, moulding, trowelling, rolling, brushing or spraying, and capable of setting to a hard glossy mass amenable to working by chiselling, turning, sawing or the like, which comprises preparing an aqueous slurry of an accelerated anhydrite plaster and a cold-hardening aqueous resin syrup containing an acid accelerator which does not react with said accelerated anhydrite plaster, said resin syrup being selected from the class consisting of urea-formaldehyde and thioureaformaldehyde resin syrups, the proportion of resin syrup to plaster not exceeding 100 parts of plaster to 8 parts of syrup.

2. A process as set forth in claim 1, in which water is added to the slurry to obtain the desired consistency.

3. A process as set forth in claim 1, in which the resin syrup is of the unstabilised type.

4. In a process for the manufacture of a plaster suitable for casting, moulding, trowelling, rolling, brushing or spraying, and capable of setting to a hard glossy mass amenable to working by chiselling, turning, sawing or the like, which comprises preparing an aqueous slurry of an accelerated anhydrite plaster and a cold-hardening aqueous resin syrup containing an acid accelerator which does not react with said accelerated anhydrite plaster, said resin syrup being selected from the class consisting of urea-formaldehyde and thiourea-formaldehyde resin syrups, the proportion of resin syrup to plaster not exceeding 100 parts of plaster to 8 parts of syrup, the step of incorporating a water-soluble softening agent.

5. A process as set forth in claim 4, in which the water-soluble softening agent is selected from the class consisting of glycerol, sugars and alginates.

6. In a process for the manufacture of a plaster suitable for casting, moulding, trowelling, rolling, brushing, or spraying, and capable of setting to a hard glossy mass amenable to working by chiselling, turning, sawing or the like, which comprises preparing an aqueous slurry of an accelerated anhydrite plaster and a cold-hardening aqueous resin syrup containing an acid accelerator which does not react with said accelerated anhydrite plaster, said resin syrup being selected from the class consisting of urea-formaldehyde and thioureaformaldehyde resin syrups, the proportion of resin syrup to plaster not exceeding 100 parts of plaster to 8 parts of syrup, the step of incorporating a comminuted filler selected from the class consisting of fibrous materials and natural and artificial mineral substances.

7. A process as set forth in claim 6, in which the filler is selected from the class consisting of disintegrated paper, wool, cotton and linen.

8. A process as set forth in claim 6, in which the filler is an artificially prepared aggregate consisting essentially of set plaster.

9. A hard elastic mass consisting essentially of a homogeneous mixture of a set accelerated anhydrite plaster and a cold-hardened resin belonging to the class consisting of urea-formaldehyde and thioureaformaldehyde resins, said mass comprising the cold-hardened reaction product of not more than 100 parts of plaster to 8 parts of resin syrup.

10. A mass as set forth in claim 9, comprising a comminuted filler.

11. A mass as set forth in claim 9, comprising a comminuted fibrous filler.

GEORGE CRAWFORD TYCE.
VICTOR LEFEBURE.